US006519608B1

(12) United States Patent
Andersen et al.

(10) Patent No.: US 6,519,608 B1
(45) Date of Patent: Feb. 11, 2003

(54) CERAMIC DESIGN TRANSFER PROCESS

(75) Inventors: Michael Andersen, Holladay, UT (US); Michael Mooslin, Los Angeles, CA (US)

(73) Assignee: Color Me Mine Enterprises, Inc., Van Nuys, CA (US)

( * ) Notice: Subject to any disclaimer, the term of this patent is extended or adjusted under 35 U.S.C. 154(b) by 272 days.

(21) Appl. No.: 09/696,716

(22) Filed: Oct. 25, 2000

(51) Int. Cl.[7] ................................................ G06F 17/30
(52) U.S. Cl. ........................................ 707/104; 707/103
(58) Field of Search ................................. 707/104, 103; 382/141, 154, 162, 283, 285, 298; 700/122; 118/696; 399/307; 430/115; 156/230; 106/426

(56) References Cited

U.S. PATENT DOCUMENTS

| | | | | |
|---|---|---|---|---|
| 5,418,041 A | * 5/1995 | Kent et al. | .................. | 156/230 |
| 5,568,391 A | * 10/1996 | McKee | ...................... | 700/122 |
| 5,894,036 A | * 4/1999 | Tylko | ......................... | 118/696 |
| 5,972,548 A | * 10/1999 | Landa et al. | ................ | 430/115 |
| 6,068,692 A | * 5/2000 | Zimmer | ...................... | 106/426 |
| 6,300,030 B1 | * 10/2001 | Weinberg et al. | ........... | 399/307 |

OTHER PUBLICATIONS

Chen et al., "An integrated intelligent system for ceramic kilne", Jan. 1999, Expert systems with applications vol. 16, No. 1 pp. 55–61.*

Printout of (28) pages of Terramia website, http://www.terramia.net, Sep. 6, 2000.

* cited by examiner

*Primary Examiner*—Sanjiv Shah
(74) *Attorney, Agent, or Firm*—Stetina Brunda Garred & Brucker

(57) ABSTRACT

A method of hand painting ceramic objects as disclosed, which allows user selection of an object to be painted and a design to be applied. A composite three dimensional image is formed of the design, as applied to an image of the selected object. The image is selectively colored as desired by the user. A two dimensional projection of the selected image is formed, the projection corresponding to the selected image, as modified to conform to the contours of the selected object. The projection is segmented by commonly colored image portions and stencils are formed, corresponding to the segments. The stencils may be sequentially applied to an article, represented by the selected object, in order to facilitate hand painting of the selected design upon the article.

13 Claims, 3 Drawing Sheets

ORDER PROCESSING MODULE 1

ORDER/PAYMENT = DEDIGNER PAYMENT +
RETAILER COMM +
PAINTING ORDER/PAYMENT

ORDER PROCESSING MODULE 2

ORDER/PAYMENT = RETAILER PAYMENT +
DESIGNER COMM +
PAINTING ORDER/PAYMENT

CERAMIC DESIGN TRANSFER PROCESS

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

The present invention relates to a technique and business method for applying selected designs and written inscriptions on two or three-dimensional objects, such as plates, jars, vases and the like.

BACKGROUND

Customized gifts or accessories useful in a variety of different circumstances. Where a particular image writing a particular meaning, it may be desirable to have the image or writing memorialized on a product. Thus, for example, a parent may wish to preserve a child's drawings or writings on a mug or plate. Contemporary technologies exist for applying photographs or the like to ceramic pieces. However, those technologies are typically photographic in nature and generally result in low quality images.

Another application for customized ceramic products relates to promotional items or private labeled items, such as mugs or plates having the name of a particular company, resort or museum. In such cases those production techniques are typically utilized which produce higher quality images, but require substantial production runs to have commercial application. Moreover, such techniques typically do not allow for highly reproducible hand painting which may provide a greater vibrance and custom feel of the product. Accordingly, there exists a need for technique to accurately reproduce, in varying production quantities, individual images or notations, as applied to ceramic products in a hand painted fashion.

Highly reproducible hand painted ceramic techniques have application beyond promotional items and other mementoes. For example, retailers may desire to use high quality hand painted reproductions of their proprietary designs on different types of products. In some cases, those products complement other articles that they sell. In other cases, the products may be unrelated to the products sold by the same source. Independent products may, for example, arise where a popular television character is juxtaposed on the ceramic product. The use of designs on related products may arise where some design coordination is desired.

For example, a homeowner or a decorator may find it advantageous to utilize a common design theme on furniture, fixtures, wall coverings, window coverings or the like. Recognizing the marketability of such coordinated products, companies offering patterned bedding (e.g., sheets and comforters) may also offer coordinating wall coverings. In some cases, lamps or other accessories may also incorporate common design components as those on sheets or bedding. In other cases, plates, vases, jars or other accessories are manufactured to incorporate the same design.

However, while coordination of furniture and fabric designs are commercially available, the range of available coordinated products is typically limited to only certain, high volume designs. Accordingly, a customer may find that the coordinating products of interest are not available in the particular bedding or wall covering design selected. Efforts to apply low volume designs to accessories, such as a jar or vase, may be beyond the practical ability of many customers or suppliers, and not economically viable for suppliers to market.

The present invention is directed to a technique and business method which will allow for the application of selected designs to two or three-dimensional objects, such as plates, mugs, jars and vases. The invention allows for the application of preselected inventory of designs, or of a custom selected design. In accordance with the present invention, even small or single orders can be economically processed to provide greater customer choices and new business opportunities for retailers and suppliers.

BRIEF SUMMARY OF THE INVENTION

A method of hand painting ceramic objects as disclosed, which allows user selection of an object to be painted and a design to be applied. A composite three-dimensional image is formed of the design, as applied to an image of the selected object. The image is selectively colored as desired by the user. A two-dimensional projection of the selected image is formed, the projection corresponding to the selected image, as modified to conform to the contours of the selected object. The projection is segmented by commonly colored image portions and stencils are formed, corresponding to the segments. The stencils may be sequentially applied to an article, represented by the selected object, in order to facilitate hand painting of the selected design upon the article.

Various techniques may be used to input and/or select from various designs and objects. The designs may be loaded into a database proximate a user's work station, or may be remotely accessed. In another embodiment, the designs may be drawn from web sites, by means such as links from a user work station, or using search engines having appropriate design selection criteria. And yet another embodiment, the image designs may be scanned in by a user, e.g. where a user intends to purchase a particular fabric design and wants a ceramic article hand painted to correspond with that design.

The ceramic articles to be painted may similarly be selected from an internal database of popular designs, or from designs available in remote database or at different web sites accessed by computer links or search engines.

The selected object and selected design are merged to a composite representation, which allows the user to properly locate and size the selected design in relation to the selected object. In accordance with the invention a three dimensional representation of the selected object is formed, or is already loaded into the object database. The selected design is mated to the contours of the selected object in such a manner to preserve the visual integrity of the design a s normally viewed when applied to the product. As will be recognized by those of ordinary skill, the result is that the selected design is modified from its original form, when viewed in a two dimensional projection of the design as applied to the contours of the selected object. Stencils are formed corresponding to the projected image, and segmented in accordance with a common color(s) applied to portions of the selected design. The stencils may include peel-off or punch-out portions allowing a painter to peel-off or punch-out all portions commonly coded to the same color. The stencils may then be applied to the article to be painted such that painting occurs only in those peeled-off or punched-out areas.

The stencils may be provided with common registration marks to assure the integrity of the completed, hand-painted design.

As explained below, various other additions, enhancements and modifications of the invention may be made within the broader spirit and scope of the invention.

DETAILED DESCRIPTION OF THE PRESENTLY PREFERRED EMBODIMENT

The detailed description set forth below in connection with the drawings is intended as a description of the presently preferred embodiment of the invention, and is not intended to represent the only forms in which the present invention may be constructed or utilized. The description sets forth the functions and the sequence of the steps for constructing and operating the invention in connection with the illustrated embodiments. It is to be understood that the same or equivalent functions may be accomplished by different embodiments that are also intended to be encompassed within the scope of the invention.

Figure 1:
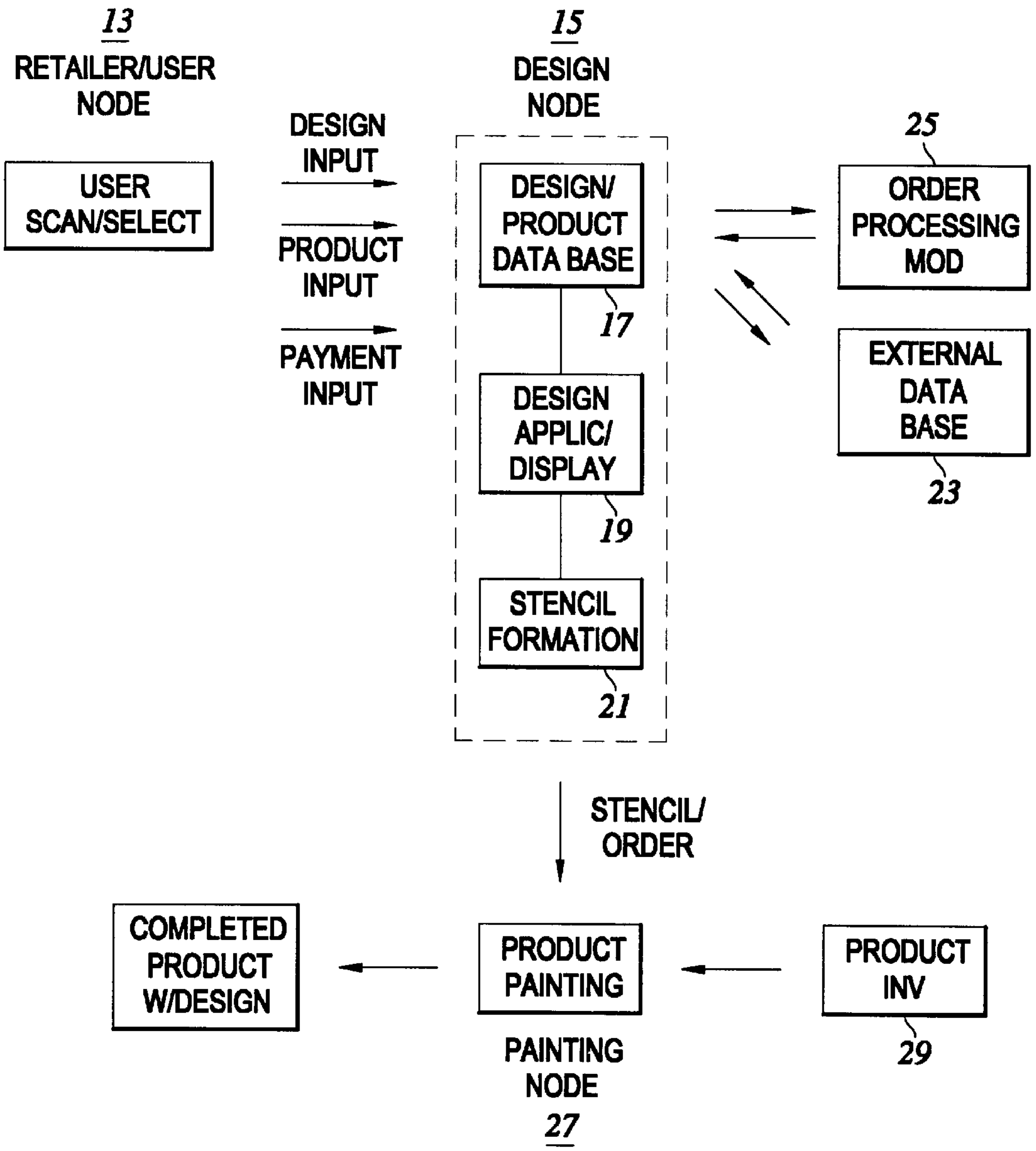
FIG. 1 is a block diagram of a business model of the present invention methodology.

FIG. 1 provides a generalized business model of the invention methodology. FIG. 1 illustrates the interaction of user with product design process including selection/application/production of a selected design on a three-dimensional object. In accordance with the present methodology, a user may purchase a three-dimensional object, bearing a hand-painted design selected by the user, sized and shaped to accommodate the contours of the selected three-dimensional object.

In accordance with FIG. 1, a retailer/user node 13 is provided to enable a retailer or user (a customer) to select a desired image design and a product to which the image design is to be applied. After selection and purchase, the customer receives a completed product, bearing the hand-painted rendition of the selected design. The completed product may ultimately/additionally include a written or computer generated font as an inscription thereon.

Retailer/user node 13 may be implemented in a variety of different constructions, and disposed at a variety of different locations. For example, the retailer/user node 13 may be implemented as a computer work station located in a retail store, similar to or as a part of a wedding registry work station, wherein customers may interact with the work station to select the image design, product and manner of payment. The work station may include a scanning device so that a customer may scan a custom selected pattern, e.g., a sheet pattern, and apply that design to a two dimensional (2D) or three dimensional object (3D). As such, a user may order custom design accessories at the same time the customer selects towels, bedding, window covering or other products. This provides significant business opportunities for promoting retail sales and full-service decor assistance.

As noted above, the invention may additionally be utilized as means of generating the custom or semi-custom memorabilia. For example, memorabilia of a company sporting event will be created by scanning tickets of the event, or other such mementos, and applying the scanned image to a mug or other object for distribution to those in attendance.

Design Node 15 enables the selection and application of a design to various products. Design Node 15 typically incorporates, or can access, design/product data base 17, design application/display module 19 and stencil formation module 21. In one implementation, a customer at retailer/user node 13 will access design node 15 to input a particular design selection, a product selection, and to complete payment processing. The design and product selection may be made upon review of designs and products stored in an internal data base 17. Designs and products so stored would typically include a selection of popular designs and products offered by one or more suppliers. In another implementation, the data base 17 may be implemented, or supplemented, by an external data base 23. The external data base 23 may be implemented in a variety of different forms. External data base 23 may be located in a remote server, or widely distributed, either in the form of distributed object/design tables, or in the form of independent web sites, identified by means of search criteria. In one form, the external data base 23 may be implemented as a search engine, or other internet access system, operative, to access one or more web sites having information and/or displays respecting available image designs and/or objects, to which the image designs may be applied. Access to the external data base 23 may be, for example, by means of computer hyperlinks from design node 15, or by means of search engines, accessible by design Node 15, and operative to locate different designs or products satisfying user defined criteria. In another implementation, the data base 17 may be supplemented by inputs from the customer via a scanner, e.g. product and/or image design scans. As such, one of ordinary skill will clearly recognize that the particular designs and products processed within design node 15 may not only include standardized selection of popular designs, but may be supplemented in various ways such as by web access and retrieval, as well as customer input designs.

Design application/display module 19, generally functions to link the selected design and object, and display the composite product to the customer. The design application/display module 19 is typically software implemented, having computer readable program code operative to combine the selected design and selected product to produce a composite visual representation, which may be sized, displayed and rotated for evaluation by the customer. As will be recognized by those of ordinary skill in the field, design application/display module 19 typically includes computer readable program code operative to map the selected image design onto an image of the selected object, allowing for user controlled selection of parameters such as size, color(s), font style and other design features. Those features may be selected and controlled by the customer from the node 13.

In accordance with the one embodiment of the present invention the selected object design, from whatever source, is translated into a three dimensional (3D) representation of the object, which may be used to form a stencil of the selected image design, having a size and shape appropriate to conform to the object contours without distorting the visual perception of the selected image. As will be recognized by one of ordinary skill in the art, a two dimensional (2D) representation of the selected image, such as a stencil of the selected image, is preferably modified, e.g. elongated in certain areas, so that when applied to a three dimensional (3D) object, vertical/horizontal/proportional contours remain substantially consistent with those of the selected image design, as viewed in two dimensions (2D) apart from the object to which it is applied. While artists recognize such factors in painting designs on ceramic articles, the cost and time required to execute such factors may be relatively high, and the reproducibility relatively low. As a consequence, the limitations of such manual techniques effectively preclude high quality commercial markets for such custom designs. The present invention utilizes techniques which overcome those shortcomings, making a wide array of custom-painted objects available at reasonable prices, while maintaining high quality and reproducibility.

Users may select from a wide array of object designs, image designs, and colors to be applied to the objects and/or images. The composite product is readily viewable by the customer before finalization of the product to be ordered, and editing is readily implemented to change colors, designs, sizes, etc. The invention therefore provides a high degree of user creative input, without burdening the user with complex execution details, or cost substantial penalties. Because the invention allows the formation of color differentiated stencils, corresponding to the selected design, as adapted for application to the selected ceramic article, hand-painting of the design onto the ceramic article is simple and efficient. Painting can be done quickly and easily, by painters having little or no formal training.

Upon finalization of the selected design and product, along with direction of appropriate features, such as color, size, font style, etc., the customer will typically execute a purchase order and provide payment information sufficient to process the order. Such payment information may include providing credit card information or the like, to facilitate acceptance and execution of a purchase order, as well as processing of the resulting product. Information regarding the function and operation of order processing module 25 is set forth below in connection with FIGS. 2*a* and 2*b*.

Stencil formation module 21 functions to receive information respecting the selected design/product/features ordered by a customer, and to form a stencil(s) therefrom. The resulting stencil(s) are formed to allow for contours of the selected product, as it may bear upon a particular size and shape of the image design. Thus, the stencil, formed as a two-dimensional sheet(s) may be shorted, elongated or otherwise modified such that, when applied to the selected three-dimensional product, the stencil will conform to and produce a visually accurate representation of the selected design. In the preferred embodiment, stencil formation module 21 functions to form a plurality of stencil portions, each of which may be considered a stencil negative of a portion of the design, corresponding to a color segment of the design, e.g., all the design portions to be painted a particular color(s). As such, the stencils, which may include numbered, or otherwise color coded punch out areas, may be serially utilized to progressively apply each color of the design to the selected product.

In one embodiment, the image stencils are connected to form a stencil color book, which is provided to an artist or technician for use in hand-painting the selected product. Such stencils/stencil book may be provided with registration marks or other means to facilitate alignment of each stencil with common reference mark formed on or applied to the selected product. Where the stencils are unbound, an alignment stencil may be formed having at least one alignment registration mark thereon. The image stencils may be similarly provided with corresponding alignment marks. The alignment stencil is initially applied to the ceramic object, such that later applied stencil alignment marks are in substantial registry with the alignment stencil registration mark.

In one implementation, the stencil is applied to the substrate and matched to the alignment mark (on the application of the first stencil) or to the registration mark (on the application of subsequent stencils) using a hinging technique. Following the proper placement of the stencil, the substrate is then heated to a temperature of 140 to 170 degrees Fahrenheit. The application tape (pre-mask) is then carefully removed, leaving intact the stencil in place and ready for weeding of specific areas to apply ceramic undercoat material.

The stencils are preferably formed of vinyl stencil material having an adhesive coating as follows:

Rolled goods

Release liner 90# polycoated layflat kraft liner 3.2 mil thickness/film caliper 0.0035 inches Heat sensitive components (allows the safe and predictable application and removable characteristics necessary for use on a ceramic bisque when incorporated with ceramic underglaze). In addition to the adhesion/releaseability functions, the presence of heat activation makes the vinyl stencil to become tighter to the substrate as it cools. This enhances the bonding process to produce very accurate shapes and objects, necessary for multi-colored objects.

Removable pressure-sensitive solvent based adhesive. The vinyl stencil material is custom cut on a 24" Graphtec Cutting Plotter utilizing information transmitted via computer by CADlink Signlab ES2 software package.

As will be apparent to those of ordinary skill, design node 15 may be co-located with retailer/user node 13, in a common work station. Alternatively, design node 15 may be implemented at a facility remote from retail/user node 13, such as at a web site maintained by a design firm, accessible to multiple retaileruser nodes 13. Similarly, order processing module 25, may be co-located with retailer/user node 13 and/or design node 15.

Painting node 27 functions to apply the selected desired design to the selected product. In practice, the selected product may be retrieved from product inventory 29, pursuant to the purchase order information communicated from design node 15. Using the stencil(s) prepared in design node 15, the painter sequentially applies the design portions to the selected product, producing a completed product having the design and features selected by a customer.

Painting node 27 and product inventory 29 may be co-located. In some implementations, the design node 15, painting node 27 and product inventory 29 may all be co-located, e.g., where the painting is done by a product manufacturer/supplier.

In other embodiments, the painting node 27 may be implemented at a retail painting studio, such as the ceramic painting studios operated by Color Me Mine, Inc. In another implementation, the painting node 27 may be implemented by individual artists under contract with operators of other nodes of the invention.

Figure 2A:
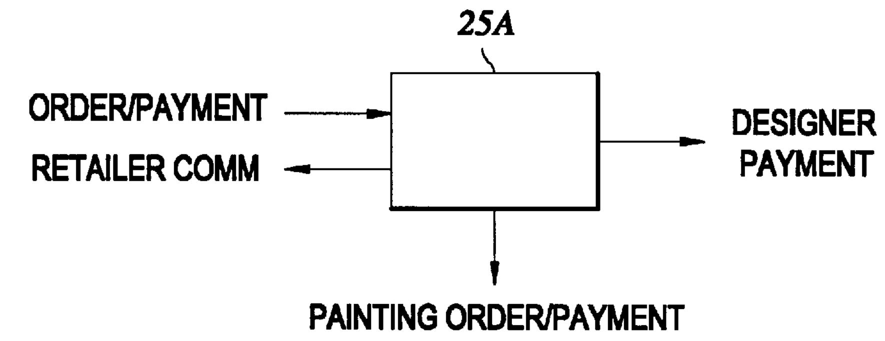
FIG. 2A illustrates one embodiment of the data processing module.
Figure 2B:
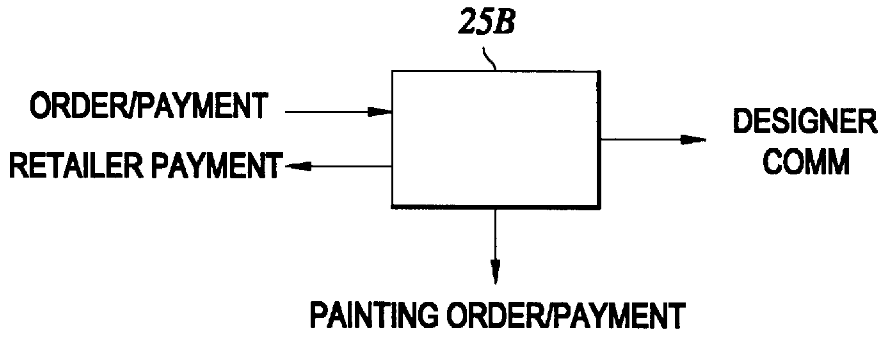
FIG. 2B illustrates an alternate embodiment of the order processing module.

FIGS. 2*a* and 2*b* illustrate alternate business methodologies to implement the functions of the order processing module 25. In the implementation shown at FIG. 2*a*, order processing module 25*a* incorporates computer readable code operative to allocate the proceeds and work assignments resulting from an order/payment received from a customer, as shown. In accordance with one implementation of the invention, a commission on the order/payment is provided to the retailer, e.g., the department store where the retailer/user node 13 is located or from whose web site the customer order originates. Payment for the painting services is sent to the artist/studio/other facility responsible to apply the selected design to the two or three dimensional object. The designer or other operator of design node 15 also receives payment from the customer order/payment.

FIG. 2*b* illustrates an alternate business methodology for implementing the order processing module 25. As shown therein, order processing module 25*b* differs from module of FIG. 2*a* insofar as type of compensation provided to the designer and retailer are reversed. In the model illustrated at FIG. 2*b*, the designer or other operator of the design node 15 receives a commission on the customer order, whereas the retailer receives payment, e.g., the profit resulting from customer payment minus designer commission and painting payment. Such a model may be appropriate where, for example, the order processing is effectuated by accounting operations of the retailer, which implements all order and payment functions associated with the customer order. Those skilled in the art will also recognize that various alternate implementations of order processing module 25 may be implemented without departing from broader aspects of the invention.

Figure 3:
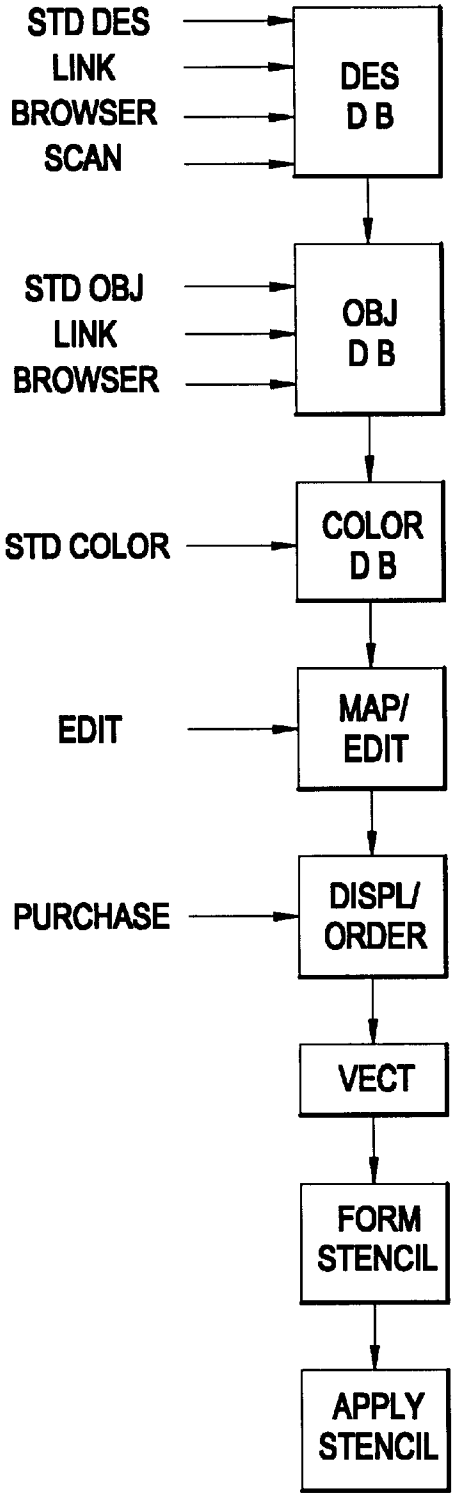
FIG. 3 block diagram illustrating the location of a hand painted three dimensional (3D) object, in accordance with the present invention.

Referring to FIG. 3, block diagrams are provided which illustrate the techniques for the custom design of two or three dimensional objects. In accordance with the invention an image design database is provided, or accessed, from which a customer selects a design. The image design database may be implemented in various forms, and can include additional designs accessed by a customer from various commercial sources. Those commercial sources may be, for example, designers, bedding suppliers, wall covering suppliers, or window covering suppliers. Such additional designs may be accessed from and appended to the design database by means of computer communication links, such as website hyperlinks, and/or may otherwise be downloaded to or otherwise become a part of the image design database. As noted above, the image design database may be implemented as a collection of designs accessed using a web browser. It is further anticipated that the image design database may be implemented or supplemented by direct customer input, such as by means of scanning a particular design in the possession of a customer. As such, a customer may select a particular bedding or sheet pattern, and have that pattern scanned to provide input to the image design database. As noted above, the scanned image may further include words or hand written inscriptions, such as drawings or writings of a friend or family member.

The object design database may also include a self-contained inventory of object designs, designs obtained from various suppliers and/or object designs obtained using web search engines. As explained more fully below, the invention typically maps selected objects to form two or three dimensional (2D or 3D) vector images, used to fabricate design stencils suitable for application of the selected design to the particular size and shape of the selected object. It is anticipated that some objects in the design database inventory may have already been translated to corresponding vectorized presentations. Other objects, particularly objects having irregular two dimensional (2D) or three dimensional (3D) features, typically need to be translated to vectorized images before appropriate stencils can be mapped and formed. In practice, mapping of two dimensional (2D) and three dimensional (3D) objects, and vectorizing of such maps, may be implemented by use of currently available computer programs, such as form Z, marketed by Auto Systems, Inc. Having mapped features of such objects, and applied the selected image design to the mapped object, two dimensional (2D) representations of the applied image can be expanded, to form a corresponding image stencil(s). The image stencil can then be segregated by color(s), as chosen by the user, with separate color(s) sorted stencils formed for sequential, color sorted application and painting.

The color database is typically loaded with a pre-selected color palette. A customer may access the color database and select one or more colors to be used in the selected design, or on the selected object, or portions thereof. It is anticipated that additional colors could be loaded into the color database by customer input.

The map/edit module functions to combine representation of the selected design and the selected object. Editing functions allow for varying the size and location of the design, as well as the color(s) applied to the design and object. Additionally, where alphanumeric characters are to be applied to the design, the editing function allows for selecting various font styles or the like. In practice, the editing function will, therefore, allow the customer to customize the color(s) of the object, apply the design to the object, size and locate the design, and separately color features of the design. The result is a coded representation of the selected object bearing the selected design usable to create a corresponding stencil. Such mapping and editing functions may be implemented by use of currently available computer programs, operative to implement creations and vector image conversions. Currently available products include computer aided sign making software, such as FlexiSign, CASmate, Gerber Scientific, Signlab, Co-Cut and Euro Vector. Vector based desktop publishing programs, also useful to implement such mapping and editing functions include Corel Draw and Adobe Illustrator. Further, computer aided design software, such as Auto Cad and Turbo Cad, may alternatively be utilized for similar functions.

Display/order module provides a display of the combined design/object as edited by the map/edit module. Preferably, the display/order module allows for rotation of the object or the like to assure customer satisfaction with the selected design/product. The module also facilitates customer order processing of payment for the product and design, as confirmed by the customer.

The process proceeds with formation of a vector image of the object and design. As noted above, the customer may select objects from a preexisting library contained in the object database. In such case, vectorized representations of the objects are likely to be already formed. In the event the customer chooses a different object, vectorized images of those objects will typically need to be formed.

The selected design is also vectorized to conform to the contours of the selected object. As noted above, where the selected object has contours, the design may need to be expanded/shortened/modified in order to accommodate those contours, while still presenting a visually accurate representation of the design, as viewed in normal usage. Thus, for example, a design may need to be elongated in areas of contour such that a frontal view of the product, with the design, still maintains the proportions of the design as viewed independent of the object contours.

Once the object and image have been vectorized, a conformal stencil can be formed to facilitate application of the design on the object. As noted above, a plurality of stencils may be formed to facilitate painting one or more colors at a time onto the object. Thus, where design includes five colors, five stencils may be formed, each including negative areas corresponding to where each color is to be applied to the product. In some cases, areas representing two or more colors may be formed into a single stencil, depending on the proximity and potential overlap of separate color areas.

As noted above, in order to facilitate application of the stencils, registration marks may be provided to facilitate common registry of the stencils upon a selected object. Stencils may then be bound into a stencil book to be used in the application of design to the selected object.

After painting, the painted object is then typically fired in accordance with contemporary ceramic production techniques. As will be recognized by those of ordinary skill, the precise sequence of steps described above, as well as the source materials used in implementing the invention may be altered or modified without departing from the broader invention concepts described herein. Consequently, while the above description illustrates one embodiment of the invention, it is intended to be exemplary, and not limiting of all colorable implementations of the inventions disclosed herein.

What is claimed is:

1. A method of applying a design to a ceramic article comprising:

a) loading a plurality of image designs onto a design database;

b) loading a plurality of object designs into an object database, the object design including information representative of the contours of an associated ceramic article;

c) loading a color palette into a color database;

d) selecting one of the image designs;

e) selecting one of the object designs;

f) sizing the selected image design for application to the selected object design;

g) selecting at least one color from the color database;

h) applying selected color(s) to the selected image design;

i) mapping the selected image design onto the selected object design;

j) forming a vectorized image of the mapped image design, the vectorized image corresponding to a translation of the mapped image design, modified in response to the contours of the ceramic article represented by the selected object design;

k) forming a plurality of image stencils, each image stencil corresponding to a commonly colored portion(s) of the vectorized image;

l) sequentially applying each of the image stencils onto an article corresponding to the selected object;

m) sequentially painting areas of the ceramic article defined by the image stencils in accordance with the selected color(s); and n) firing the painted ceramic article.

2. The method as recited in claim 1 further including the step of:

a) assembling the image stencils into a color book such that the image stencils are commonly aligned.

3. The method as recited in claim 2 further including the steps of:

a) forming an alignment stencil, the alignment stencil having at least one reference mark from thereon;

b) forming at least one alignment mark on each image stencil;

c) applying the alignment stencil to the ceramic article; and d) applying the image stencils to the ceramic article such that the stencil alignment marks are in substantial registry with the alignment stencil reference mark.

4. The method as recited in claim 1 further including the steps of:

a) heating the ceramic article after application of at least one of the stencils; and b) pressing the heated stencil(s) into place upon the ceramic object.

5. The method as recited in claim 1 wherein the step of loading object designs comprises:

a) scanning a selected ceramic article;

b) forming an object design of the scanned ceramic article; and c) translating the object design into a three dimensional (3D) representation of the scanned ceramic article.

6. The method as recited in claim 5 wherein the image design database is distributed, encompassing image designs accessible at a plurality of web sites on the world wide web.

7. The method as recited in claim 1 wherein the step of loading a plurality of image designs comprises the step of:

a) downloading a image designs from at least one website into the image design database.

8. The method as recited in claim 1 wherein the image design database is distributed, encompassing image designs accessible at a plurality of web sites on the world wide web.

9. The method as recited in claim 1 wherein the object database is distributed, encompassing object designs accessible at a plurality of web sites on the world wide web.

10. The method as recited in claim 9 further comprising the step of translating an object design, accessed on the world wide web, into a three dimensional (3D) representation of an accessed object design.

11. The method as recited in claim 9 wherein the image design database is distributed, encompassing image designs accessible at a plurality of web sites on the world wide web.

12. A method of decorating ceramic objects with user selected designs comprising:

a) selecting an object to be decorated;

b) selecting an image to be applied to the selected object;

c) forming a composite three dimensional representation of the selected image as applied to the selected object;

d) applying a representation of the selected image to the three dimensional (3D) representation of the selected object;

f) forming a two dimensional (2D) projection, the projection being representative of the selected image, as modified to accommodate the contours of the selected object;

g) selecting color(s) for decorating the selected image;

h) segmenting the projection into image portion(s) having a common selected color(s);

i) forming stencil(s) corresponding to the color segmented portions of the projection; and j) sequentially applying the stencil(s) to the object to facilitate sequential application of paint colors to the selected object.

13. A method of producing hand painted ceramic objects having designs corresponding to user selected fabric designs comprising:

a) providing a work station approximate an inventory of fabric designs;

b) inputting by the work station a selected fabric design;

c) selecting by the work station an object to which the selected design is to be applied;

d) selecting color(s) to be used in painting the selected design on the object;

e) forming a two dimensional projection of the selected image, the projection being representative of the selected design, as modified to accommodate the contours of the selected object; and f) forming stencil(s) corresponding to color segmented portions of the projection; and g) sequentially applying the stencil(s) to an article corresponding to the selected object to facilitate hand painting of the article.

* * * * *